United States Patent [19]
Sato et al.

[11] Patent Number: 4,937,152
[45] Date of Patent: Jun. 26, 1990

[54] FUEL CELL

[75] Inventors: Yoshio Sato; Hiroshi Tsuneizumi; Hirotaka Nakagawa; Eiji Morishige; Hiroshi Mihara, all of Tokyo, Japan

[73] Assignee: NKK Corporation, Tokyo, Japan

[21] Appl. No.: 410,335

[22] Filed: Sep. 20, 1989

[30] Foreign Application Priority Data

Sep. 26, 1988 [JP] Japan .............................. 63-124757[U]
Oct. 31, 1988 [JP] Japan .............................. 63-142253[U]
Nov. 2, 1988 [JP] Japan .............................. 63-278123[U]
Nov. 15, 1988 [JP] Japan .............................. 63-148787[U]

[51] Int. Cl.$^5$ ............................................. H01M 8/02
[52] U.S. Cl. ........................................ 429/30; 429/34; 429/39
[58] Field of Search ................... 429/30, 33, 34–39; 427/115

[56] References Cited

U.S. PATENT DOCUMENTS

| | | | |
|---|---|---|---|
| 4,562,123 | 12/1985 | Shimizu et al. | 429/30 X |
| 4,699,853 | 10/1987 | Okada et al. | 429/38 X |
| 4,770,955 | 9/1988 | Ruhl | 429/33 |
| 4,857,420 | 8/1989 | Maride et al. | 429/30 |

Primary Examiner—Anthony Skapars
Attorney, Agent, or Firm—Frishauf, Holtz, Goodman & Woodward

[57] ABSTRACT

A fuel cell comprises a stack of cell members, each cell member including a flat-plate separator, an air electrode, a solid electrolyte and a fuel electrode, spacers arranged along peripheries of the separators among the separators of the stack of cell members, air supply paths for supplying air to the air electrodes, air being sent to the air electrodes through grooves of the flat-plate separators and air supply paths, air exhaust paths for exhausting excessive air, fuel supply paths for sending fuel to the fuel electrodes and fuel discharge paths for discharging excessive fuel. The fuel cell has an oxidation-resistant coating layer on the surface of the separator on the side of the air electrode. The solid electrolyte is made by the use of one selected from the group of Laser Physical Vapor Deposition Method, Plasma Thermal Spraying Method, Electron Beam Vapor Deposition Method and Sputtering Method. The air electrode comprises a mixed powder of lanthanum manganese oxide doped with strontium oxide and yttria-stabilized zirconia.

22 Claims, 8 Drawing Sheets

FUEL CELL

BACKGROUND OF THE INVENTION

1. Field of the Invention

The present invention relates to a fuel cell, and more particularly to a flat-plate type solid electrolyte fuel cell.

2. Description of the Prior Art

A solid electrolyte type fuel cell is constituted by arranging a number of cell members wherein electrode portions are formed and electrically connecting those cell members.

A fuel cell as shown in FIG. 1 is pointed out as having flat-plate cell members among cell members in the prior art solid electrolyte type fuel cells.

Cell member 44 comprises flat-plate solid electrolyte 41, flat-plate air electrode 42 formed on one side of flat-plate solid electrolyte 41 and fuel electrode 43 formed on the other side of flat-plate solid electrolyte 41. Distributers 45 are mounted on both of the surfaces of the electrode of the cell member 44. Each of distributers 45 is made of gas-permeable, electrically conductive, atmosphere proof and cushioning metallic foam, ceramic felt, ceramic foam and the like. Interconnectors 46 are positioned on both of the outer surfaces of distributers 45 so that interconnectors 46 can push distributers 46 to the surfaces of the electrodes. This electrode member 44, distributers 45 and interconnectors 46 constitute a unit and a number of units are stacked up in multiple layers. An electric circuit is constituted by connecting the most outer interconnectors. Space formed by air electrode 42 and interconnector 46 makes an air path, through which air is supplied. An O ring is put into the space formed by fuel electrode 43 and interconnector 46, thereby a fuel path being formed. Fuel is supplied into said fuel path.

There, however, have been the following problems in the solid electrolyte type fuel cell, for which said prior art flat-plate cell member was used:

(1) Since strength of the cell member itself is small, even though a foaming material and a felt material play a role of a cushion, the cell member can break when the cell members are stacked up in multiple layers.

(2) For the same reason as mentioned above, a cell member of a large area is hard to manufacture.

(3) A creep deformation and the like can be produced by a long time contact with a foaming material and a felt material and the electrode member deteriorates.

SUMMARY OF THE INVENTION

It is an object of the present invention to provide a high-strength flat-plate type solid electrolyte fuel cell, wherein no layer separation and no break thereof are produced.

To accomplish said object, the present invention provides a fuel cell comprising:

a cell member including a flat-plate separator, an air electrode, a solid electrolyte and a fuel electrode, at least two cell members being stacked up in layers, said flat-plate separator being made from metal and having a plurality of grooves; a layer of said air electrode being formed on the flat-plate separator; said solid electrolyte being formed in the form of a film layer on the air electrode; and a layer of said fuel electrode being formed on the solid electrolyte;

spacers arranged along peripheries of said separators among said separators of the cell members stacked up;

air supply paths for supplying air to said air electrodes, air being sent to said air electrodes through grooves of said flat-plate separators and air supply paths;

air exhaust paths for exhausting excessive air;

fuel supply paths for sending fuel to said fuel electrodes; and fuel discharge paths for discharging excessive fuel.

Further, the present invention provides another fuel cell comprising:

a cell member including a flat-plate separator, a fuel electrode, a solid electrolyte and an air electrode, at least two cell members stacked up in layers, said flat-plate separator being made from metal and having a plurality of grooves, a layer of said fuel electrode being formed on the flat-plate separator, said solid electrolyte being formed in the form of a film layer on the fuel electrode and a layer of said air electrode being formed on the solid electrolyte;

spacers arranged along peripheries of said separators among said separators of the cell members stacked up;

fuel supply paths for sending fuel to said fuel electrodes, fuel being sent to the fuel electrodes through grooves of said flat-plate separators and said fuel supply paths;

fuel discharge pahts for discharging excessive fuel;

air supply paths for sending air to said air electrodes; and air exhaust paths for exhausting excessive air.

The above object and other objects and advantages of the present invention will become apparent from the detailed description to follow, taken in connection with the appended drawings.

DESCRIPTION OF THE PREFERRED EMBODIMENTS

First Embodiment

Figure 1:
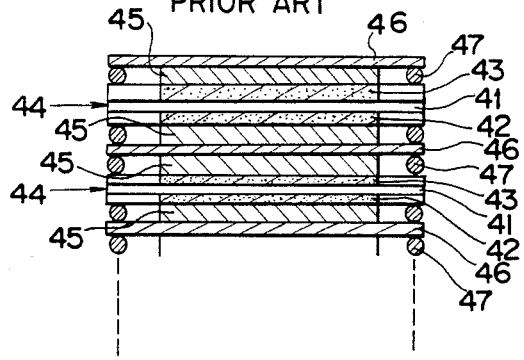
FIG. 1 is an explanatory view illustrating the prior art fuel cell of flat-plate type solid electrolyte.
Figure 2:
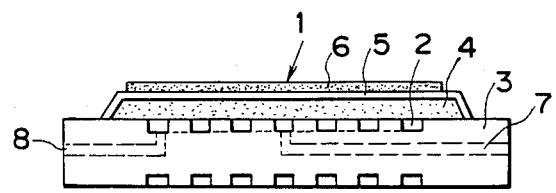
FIG. 2(a) is a sectional view of a cell member for a fuel cell of the present invention.
FIG. 2(b) is a top plan view of the cell member for the fuel cell of the present invention.
FIG. 2(c) is a perspective view illustrating the fuel cell of the present invention.
Figure 2:
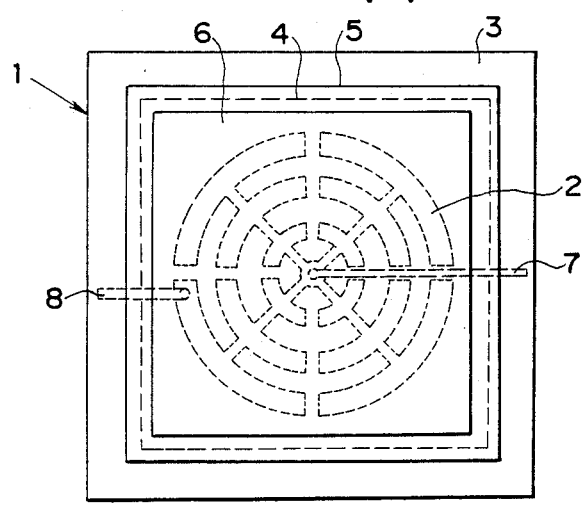
Figure 2C:
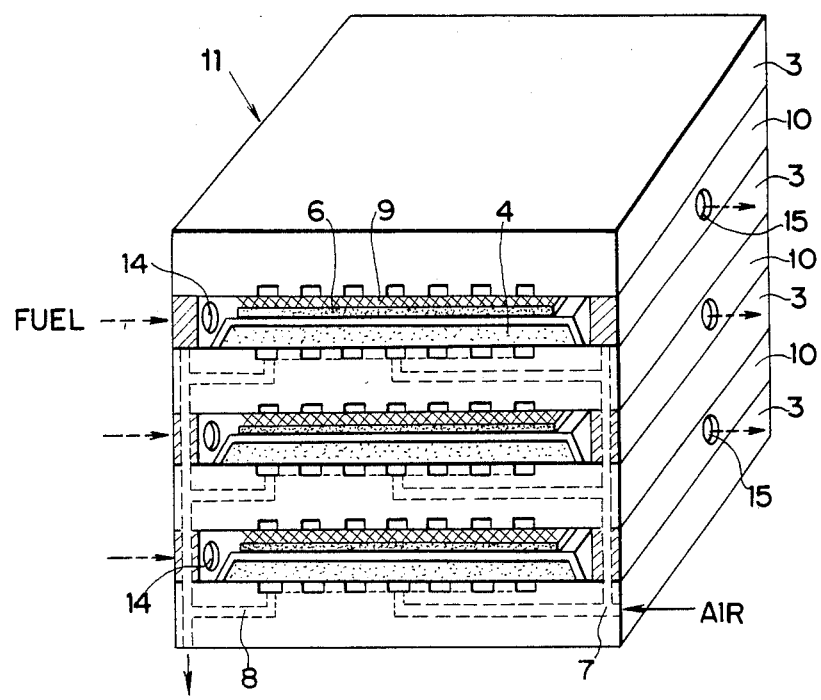

FIG. 2(a) is a sectional view of the cell member used for the flat-plate type solid electrolyte fuel cell of the present invention. FIG. 2(b) is a top plan view of the cell member for the flat-plate type solid electrolyte fuel cell. This cell member 1 is manufactured by forming layers of air electrode 4, solid electrolyte 5 and fuel electrode 6 in this order on metallic flat-plate separator 3 which is made to be a high strength substrate having grooves 2 on both sides thereof except for a peripheral portion thereof. Grooves 2 of separator 3 are radially arranged in the form of a plurality of rings as shown in FIG. 2(b). Air is supplied to air electrode 4 through air supply path 7 and grooves 2. Excessive air is exhausted through air exhaust path 8. Cell members 1 are stacked up in several layers, nickel felt 9 being put among electrodes 1 as shown in FIG. 2(c). In FIG. 2(c), cell members are stacked up in three layers. Spacers 10 are arranged among separators 3 of the cell members along peripheral portions of separators 3. A tightly closed spacer is formed among separators. In this way, the flat-plate type solid electrolyte fuel cell 11 is formed. Air is sent from air supply path 7 to each of air electrodes 4 contacting the upper surface of separator 3. Excessive air is exhausted from air exhaust path 8. Fuel is sent from fuel supply path 14 positioned in spacer 10 to fuel electrode 6 contacting the lower surface of separator 3. Excessive fuel is discharged from fuel discharge path 15.

A structure of cell member 1 of the fuel cell 11 will now be described in detail. Ni alloy containing Fe and Cr is preferred as a metallic flat plate. Grooves 2 are radially arranged in the form of a plurality of rings on both sides of separator 3. A thickness of the separator 3 is desired to be large enough not to be deformed by a pressing force and the like when separators 3 form a cell. Sintered plates made by forming lanthanum manganese oxide doped with strontium oxide into a porous flat plate of approximately 40 $\mu$m in thickness are used as the air electrode 4. Said sintered plate is stacked up in layers on the separator 3 and fixed thereon. The sintered plate is made by forming mixed powder of lanthanum manganese oxide doped with strontium oxide and yttria-stabilized zirconia (YSZ) into a porous flat plate can be used as the air electrode 4. A film layer of yttria-stabilized zirconia forming solid electrolyte 5 is formed on the air electrode 4. Said layer is formed by at least one selected from the group of laser physical vapor deposition method, plasma thermal spraying method, electron beam vapor deposition method or sputtering method. The formed layers become dense electrolyte layers.

Further, fuel electrode 6 is formed by thermally spraying nickel or nickel oxide on solid electrolyte 5. Nickel felt 9 is put among cell members 1 for the purpose of securing electrical conductivity, gas permeability and a cushioning property.

The air electrode 4 can have a boundary layer, which comprises metallic components of the separator and lanthanum manganese oxide of the air electrode, and which is rich in the metallic components of the separator on the side of the separator and rich in lanthanum manganese oxide on the side of the air electrode. The components are changed smoothly from the side of the separator to the air electrode by the use of the air electrode having the boundary layers. Breakage of the layers to be produced by thermal stress due to the difference between the coefficient of linear expansion of the separator and that of the air electrode can be prevented.

The air electrode 4 can have a boundary layer, which contacts the solid electrolyte 5, which comprises components of the solid electrolyte and components of the air electrode, and which is rich in the components of the solid electrolyte on the side of the solid electrolyte and rich in the components of the air electrode on the side of the air electrode.

Further, the fuel electrode 4 can have a boundary layer, which contacts the solid electrolyte 5, which comprises components of the solid electrolyte and components of the fuel electrode, and which is rich in the components of the solid electrolyte on the side of the solid electrolyte and rich in the components of the fuel electrode on the side of the fuel electrode.

Figure 3:
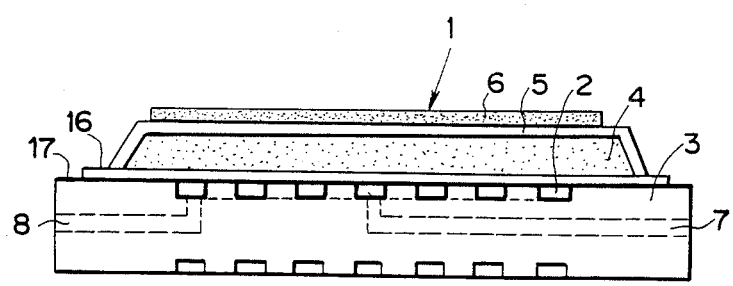
FIG. 3 is a sectional view designating another cell member of the fuel cell of the present invention.

Substrate 16 can be put between the separator and the air electrode as shown in FIG. 3. A Ni-Cr alloy plate or $Cr_3C_2$ sintered plate is used as the substrate. Since film layers of the air electrode 4, solid electrolyte 5 and fuel elecrode 6 are formed on the substrate, the cell member can have a high strength. Therefore, cells of large area can be stacked up in multiple layers.

Oxidation-resistant coating layers 17 as shown in FIG. 3 can be formed on the surface of the separator on the side of the air electrode. The oxidation-resistant coating layers are desired to be formed by dense material having an electrical conductivity. Lanthanum maganese oxide doped with strontium oxide or lanthanum cobalt oxide are used for the oxidation-resistant coating layers. Oxidation resistance of the separator at high temperatures can be increased by forming those oxidation-resistant layers. A cell member having the substrate and the oxidation-resistant coating layers is shown in FIG. 3.

Figure 4:
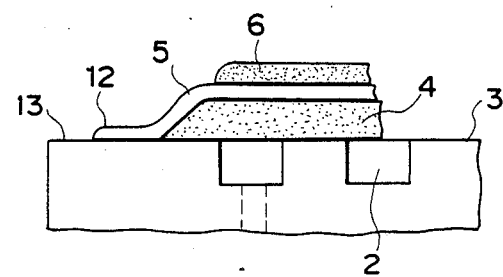
FIG. 4 is a sectional view designating a peripheral portion of the cell member for the fuel cell of the present invention.

In cell member 1, a peripheral portion of air electrode 4 contacting separator 3 is desired to be sealed with solid electrolyte 5. Thus, gas seal materials such as 0 ring 47 and the like used between fuel electrode 43 and interconnector 46 as mentioned in the prior art become unnecessary. FIG. 4 is a schematic view designating film layers formed so that air electrode 4 can contact peripheral portion 13 of separator 3. A peripheral portion of air electrode 4 is sealed with stretching portion 12 of solid electrolyte 5

Figure 5:
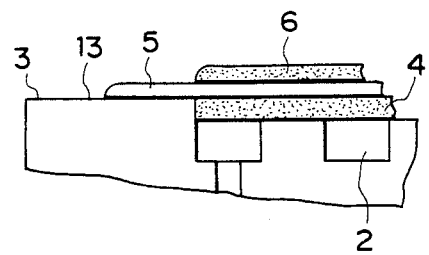
FIG. 5 is a sectional view designating another peripheral portion of the cell member of the present invention.

FIG. 5 is a schematic view illustrating a state such that the level of the upper surface of air electrode 4 contacting separator 3 is equal to the level of the upper surface of separator 3 so that the solid electrolyte 5 can be flat. Air electrode 4 is sufficiently sealed since the peripheral portion of solid electrolyte 5 contacts separator 3.

In the First Embodiment described above, the following effects can be obtained:

(1) Since the separator is a high-strength member, other materials (the solid electrolyte, the fuel electrode and the air electrode) are not limited by a strength of the materials. In consequence, essential functions of the fuel cell can be designed, emphasis being put on the functions.

(2) An area of the electrode member can be enlarged.

(3) Since metallic materials are used for the separator, a heat distribution in the electrode member becomes uniform and this increases a performance of the cell.

Second Embodiment

Figure 6A:
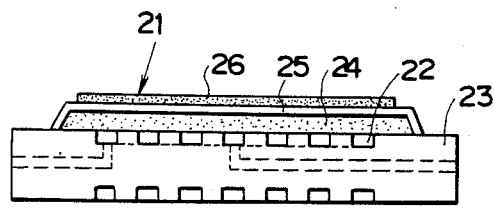
FIG. 6(a) is a sectional view of a cell member for a second embodiment of a fuel cell of the present invention.
Figure 6B:
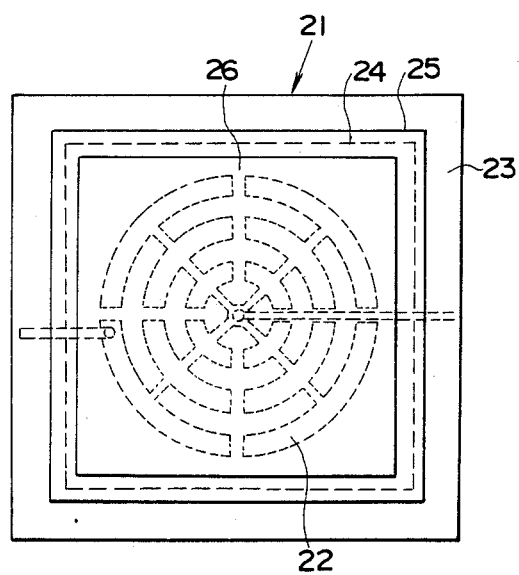
FIG. 6(b) is a top plan view of the cell member for another fuel cell of the present invention.

FIG. 6(a) is a sectional view of a cell member of a second embodiment of a fuel cell of the present invention. FIG. 6(b) is a top plan view of said cell member for the second embodiment of the fuel cell of the present invention. The cell member 21 is manufactured by stacking up and fixing fuel electrode 24, solid electrolyte 25 and air electrode 26 in multiple layers in this order on metallic flat-plate separator 23. Metallic flat-plate separator 23 becomes a high-strength substrate with grooves 22 on both surfaces except for the peripheral portion. The cell member 21 will now be described in detail. A metallic plate is used for separator 23. Ni alloy containing Fe and Cr is desirable as the metallic flat plate. The separator is desired to be thick enough not to be deformed by a tightening force during stacking, tightening and fixing of the cell members 21. Grooves 22 serving as paths for air and fuel are made on the both surfaces of separator 23.

Figure 7:
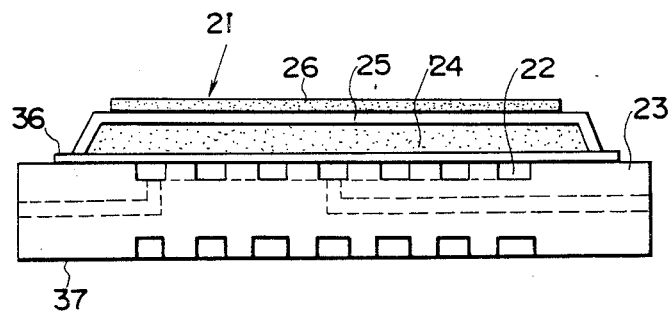
FIG. 7 is a top plan view of another cell member of the fuel cell of the second embodiment of the present invention.

Oxidation-resistant coating layes 37 as shown in FIG. 7 can be formed on the surface of the separator on the side of the air electrode. The oxidation-resistant coating layers are desired to be formed by dense material having an electrical conductivity. Lanthanum manganese oxide doped with strontium oxide or lanthanum cobalt oxide is used for the oxidation-resiatant coating layers. High-temperature oxidation resistance of the separator can be increased by forming the oxidation-resistant coating layers.

Substrate 36 is desired to be put between the separator 23 and the fuel electrode 24. One selected from the group of Ni sintered plate, Ni mesh, Ni plate or Ni net is desired to be used for the substrate 36.

Layers of yttria-stabilized zirconia (YSZ) are formed as the solid electrolyte 25 on the fuel electrode 24. Said layers are formed by at least one selected from the group of laser physical vapor deposition method, plasma thermal spraying method, electron beam vapor deposition method and sputtering method. Formed layers become dense electrolyte layers.

A porous flat plate of 10 to 100 μm in thickness, which is obtained by forming lanthanum manganese oxide doped with strontium oxide into film layers, is used for the air electrode 26. Film layers of said air electrode are stacked up on the surface of the solid electrolyte 25. Besides said sintered plate, film layers obtained by forming mixed powder of lanthanum manganese oxide doped with strontium oxide and yttria-stabilized zirconia (YSZ) into a porous flat plate can be used for the air electrode 4. Cell members 21 manufactured in this way are stacked up in a number of layers to form a fuel cell.

Said fuel electrode can have a boundary layer, which contacts the separator, which comprises components of the separator and components of the fuel electrode, and which is rich in the components of the separator on the side of the separator and rich in the components of the fuel electrode on the side of the fuel electrode.

Said fuel electrode can have a boundary layer, which contacts the solid electrolyte, which comprises components of the solid electrolyte and components of the fuel electrode, and which is rich in the components of the solid electrolyte on the side of the solid electrolyte and rich in the components of the fuel electrode on the side of the fuel electrode.

Said air electrode can have a boundary layer, which contacts the solid electrolyte, which comprises components of the solid electrolyte and components of the air electrode, and which is rich in the components of the solid electrolyte on the side of the solid electrolyte and rich in the components of the air electrode on the side of the air electrode.

Examples of the cases when the fuel electrode has a first boundary layer contacting the solid electrolyte and the air electrode has a second boundary layer contacting the solid electrolyte will be shown. In boundary layers, components in one layer gradually substitute for components in the other layer. In the first boundary layer, the components of layers of the fuel electrode are made to substitute smoothly or step-by-step for the components of the solid electrolyte. In the second layer, the components of the solid electrolyte are made to substitute smoothly or step-by-step for the components of the air electrode.

In an example of manufacturing of the cell member, a procedure in case of using a Ni sintered plate as a substrate will be described below.

(a): a boundary layer between the fuel electrode and a solid electrolyte is formed by adding yttria-stabilized zirconia (YSZ) powder to Ni powder and thermally spraying Ni powder, gradually increasing yttria-stabilized zirconia powder added to Ni powder;

(b): 100% yttria-stabilized zirconia powder is thermally sprayed to make a solid electrolyte;

(c): a boundary layer between the solid electrolyte and an air electrode is formed by adding an air electrode material powder of lanthanum strontium manganese oxide to the yttria-stabilized zirconia powder; and (d): 100% lanthanum strontium manganese oxide is thermally sprayed to make an air electrode.

A breaking of each of the layers to be caused by a thermal stress produced by differences in coefficients of linear expansion of each of the layers can be prevented and the differences in coefficients can be allowed in some degrees in the selection of materials for each of the layers.

Figure 6C:
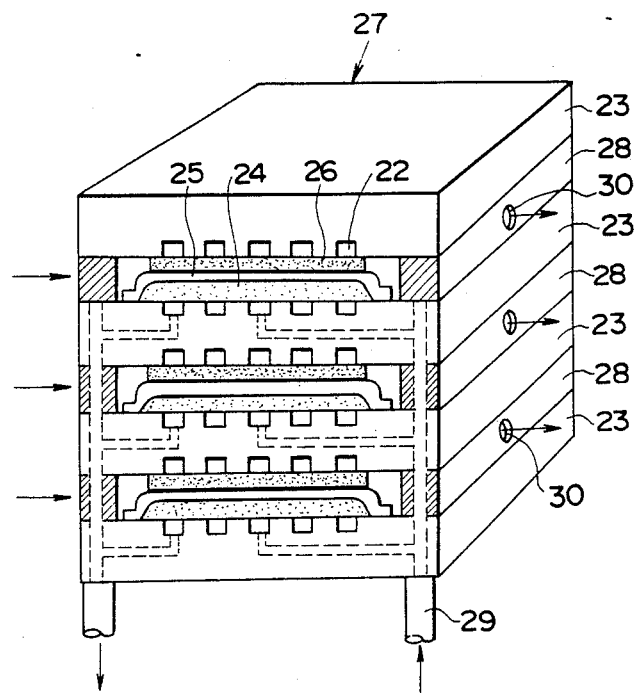
FIG. 6(c) is a perspective view illustrating the fuel cell of the present invention.

FIG. 6(c) is a perspective view illustrating the fuel cell 27 of flat-plate type solid electrolyte constituted in such a manner as described above. The fuel cell 27 of flat-plate type solid electrolyte, cell members 27 are stacked up in multiple layers by means of spacers 28

FIG. 6(c) shows a fuel cell, in which cell members 21 are stacked up in three layers. Fuel supply path 29 is formed in separators 23 and spacers 28. Air supply paths are formed in spacers 28. Fuel is supplied to fuel cell 24 contacting the upper surface of separator 23 through fuel supply path 29. Air is supplied to air electrode 26 contacting the lower surface of separator 23 through air supply path 30 and grooves 22 of separator 23. Excessive air is exhausted through path 30.

Figure 8:
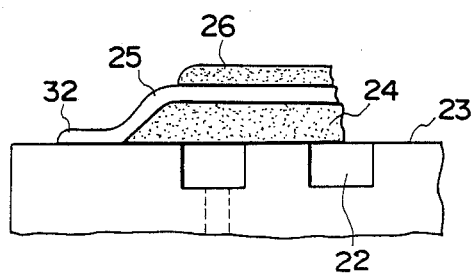
FIG. 8 is a schematic view designating an example of a peripheral portion of the cell member for the fuel cell of the present invention.
Figure 9:
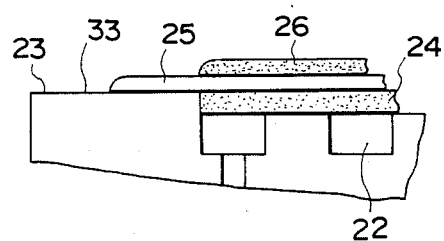
FIG. 9 is a schematic view designating another example of the cell member for the second embodiment of the fuel cell of the present invention.

In cell member 21, the peripheral portion of fuel electrode 24 contacting separator 23 is desired to be sealed with solid electrolyte 25. Thus, gas seal materials such as O ring 47 and the like used between fuel electrode 43 and interconnector 46 described in the prior art become unnecessary. FIG. 8 is a schematic view illustrating fuel electrode 24 formed into a film layer so that fuel electrode 24 can contact peripheral flat portion 33 of separator 23. The peripheral portion of fuel electrode 24 is sealed with stretching portion 32 of solid electrolyte 25. FIG. 9 is a schematic view illustrating a state such that the level of the upper surface of electrode 24 contacting separator 23 is equal to the level of the upper surface of separator 23 so that the solid electrolyte 25 can be flat. Since the peripheral portion of solid electrolyte 25 contacts separator 23, fuel electrode 24 is sufficiently sealed.

Sintered layers made of air electrode materials are desired to be formed between air electrode 26 and separator 23 to secure electric conductivity between air electrode 26 and separator 23. Those sintered layers are formed by sintering air electrode materials after having coated the surfaces of air electrode 26 and separator 23 facing each other with a slurry air electrode material. Small voids present between air electrode 26 and separator 23 are liquidated by sintering the slurry air electrode material. Therefore, a good electrical conductivity between air electrode 26 and separator 23 can be shown. LSM (lanthanum maganese oxide doped with strontium oxide), to which an appropriate solvent is added, is the slurry air electrode material. The same object can be accomplished not by forming air electrode 6 on solid electrolyte 5, but by sintering solid electrolyte 5 after having coated electrolyte 5 with LSM, to which an appropriate solvent was added

EXAMPLE 1

A substrate was put on a separator. Film layers of an air electrode, a solid electrolyte and a fuel electrode are formed in this order on the substrate. In Table 1, materials, thickness and area of the separator, air electrode, solid electrolyte, fuel electrode and substrate are shown.

TABLE 1

| | Materials | Thickness | Area |
|---|---|---|---|
| Separator (With Grooves) | Ni-Cr Alloy | 1 mm | 100 cm$^2$ |
| Air Electrode | La$_{0.85}$Sr$_{0.15}$MnO$_3$ | 40 μm | 100 cm$^2$ |
| Solid Electrolyte | YSZ (8 mol % Y$_2$O$_3$) | 40 μm | 100 cm$^2$ |
| Fuel Electrode | NiO-YSZ | 50 μm | 100 cm$^2$ |
| Substrate with Film Layers | Ni-mesh | 0.2 mm | 100 cm$^2$ |

Figure 10:
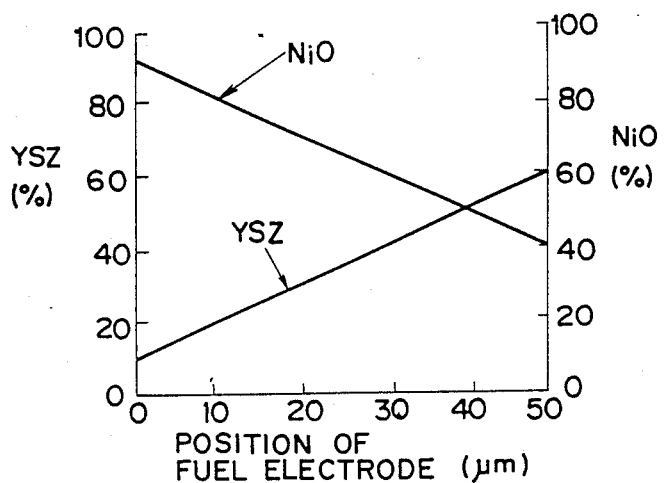
FIG. 10 is a graphical representation showing a distribution of compounds in the fuel electrode from a substrate to the side of the solid electrolyte of Example-1.
Figure 11:
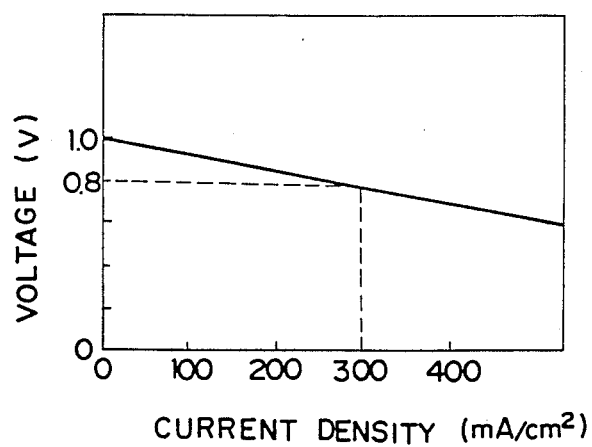
FIG. 11 is a graphical representation showing the relation between electric current density and voltage in the case of Example-1.

In FIG. 10, a distribution of components from the side of the substrate with film layers to the side of the solid electrolyte is shown. in FIG. 11, the relation between electric current density and voltage in the case of using H$_2$ for the fuel electrode at a rate of 1 l/min. and air for the air electrode at a rate of 10 l/min. is shown. When the electric current density was 300 mA/cm$^2$, the voltage was 0.8 V.

EXAMPLE 2

In Table 2, materials, thickness and areas of the separator, air electrode, solid electrolyte, fuel electrode and substrate are shown.

TABLE 2

| | Materials | Thickness | Area |
|---|---|---|---|
| Separator (With Grooves) | Ni-Cr Alloy | 1 mm | 100 cm$^2$ |
| Air Electrode | La$_{0.85}$Sr$_{0.15}$MnO$_3$-YSZ | 40 μm | 100 cm$^2$ |
| Solid Electrolyte | YSZ (8 mol % Y$_2$O$_3$) | 40 μm | 100 cm$^2$ |
| Fuel Electrode | NiO-YSZ | 50 μm | 100 cm$^2$ |
| Substrate | Ni-mesh | 0.2 mm | 100 cm$^2$ |

Figure 12:
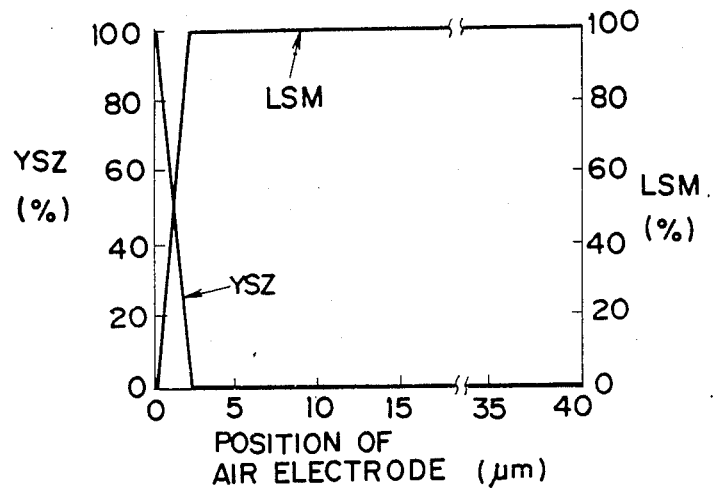
FIG. 12 is a graphical representation showing a distribution of components in the air electrode from the solid electrolyte to the side of separator of Example-2.
Figure 13:
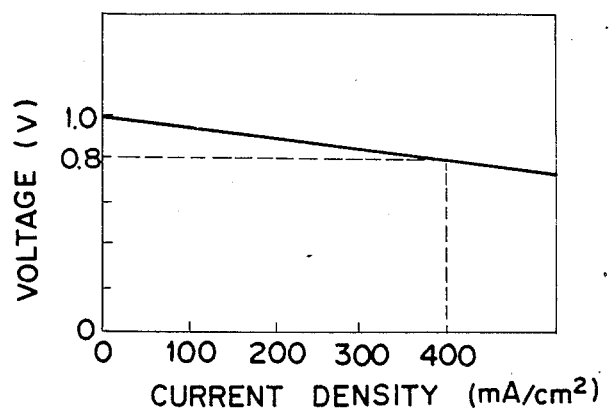
FIG. 13 is a graphical representation showing the relation beween electric current density and voltage in the case of Example-2.

In FIG. 12, a distribution of the components from the side of the solid electrolyte of the air electrode to the side of the separator is shown. The fuel electrode has the same distribution of the components from the side of the substrate to the side of the solid electrolyte as in Example 1 as shown in FIG. 10. In FIG. 13, the relation between electric current density and voltage in the case of using H$_2$ for the fuel electrode at a rate of 1 l/min. and air for the air electrode at a rate of 10 l/min. is shown. When the electric current density was 400 mA/cm$^2$, the voltage was 0.8 V.

What is claimed:

1. A fuel cell comprising:
a cell member including a flat-plate separator, an air electrode, a solid electrolyte and a fuel electrode, at least two cell members being stacked up in layers, said flat-plate separator being made from metal and having a plurality of grooves; a layer of said air electrode being formed on the flat-plate separator; said solid electrolyte being formed in the form of a film layer on the air electrode; and a layer of said fuel electrode being formed on the solid electrolyte;

spacers which are arranged along peripheries of said separators among said separators of the cell members stacked up;

air supply paths for supplying air to said air electrodes, air being sent to said air electrodes through grooves of said flat-plate separators and air supply paths;

air exhaust paths for exhausting excessive air;

fuel supply paths for sensing fuel to said fuel electrodes; and fuel discharge paths for discharging excessive fuel.

2. The fuel cell of claim 1, wherein said air electrode has a boundary layer, which contacts the flat-plate separator, which comprises components of the separator and components composing the air electrode, and which is rich in components of the separator on the side of the separator and rich in components of the air electrode on the side of the air electrode.

3. The fuel cell of claim 1, wherein said air electrode has a boundary layer, which contacts the solid electrolyte, which comprises components of the solid electrolyte and components of the air electrode, and which is rich in components of the solid electrolyte on the side of the solid electrolyte and rich in components of the air electrode on the side of the air electrode.

4. The fuel cell of claim 1, wherein said fuel electrode has a boundary layer, which contacts the solid electrolyte, which comprises components of the solid electrolyte and components of the fuel electrode, and which is rich in components of the solid electrolyte on the side of the solid electrolyte and rich in components of the fuel electrode on the side of the fuel electrode.

5. The fuel cell of claim 1, wherein said air electrode has a boundary layer, which contacts the flat-plate separator, which comprises components of the separator and components of the air electrode, and which is rich in components of the separator on the side of the separator and rich in components of the air electrode on the side of the air electrode;

said air electrode has a boundary layer, which contacts the solid electrolyte, which comprises components of the solid electrolyte and components of the air electrode, and which is rich in components of the solid electrolyte on the side of the solid electrolyte and rich in components of the air electrode on the side of the air electrode; and said fuel electrode has a boundary layer, which contacts the solid electrolyte, which comprises components of the solid electrolyte and components of the fuel electrode, and which is rich in components of the solid electrolyte on the side of the solid electrolyte and rich in components of the fuel electrode on the side of the fuel electrode.

6. The fuel cell of claim 1, which further comprises a substrate between the separator and the air electrode.

7. The fuel cell of claim 1, which further comprises an oxidation-resistant layer on the surface of the separator on the side of the air electrode.

8. The fuel cell of claim 1, which further comprises a nickel felt material between the fuel electrode and the separator in each of the cell members stacked up in layers.

9. The fuel cell of claim 1, which further comprises
a substrate between the separator and air electrode;
an oxidation-resistant coating layer on the surface of the separator on the side of the air electrode; and
a nickel felt material between the fuel electrode and the separator in each of the cell members stacked up in layers.

10. The fuel cell of claim 1, wherein said solid electrolyte is a dense electrolyte made by the use of at least one selected from the group consisting of Laser Physical Vapor Deposition Method, Plasma Thermal Spraying Method, Electron Beam Vapor Deposition Method and Sputtering Method.

11. The fuel cell of claim 1, wherein said air electrode is an air electrode made from a mixed powder of lanthanum manganese oxide doped with strontium oxide and yttria-stabilized zirconia.

12. A fuel cell comprising:
a cell member including a flat-plate separator, a fuel electrode, a solid electrolyte and an air electrode, at least two cell members stacked up in layers, said flat-plate separator being made from metal and having a plurality of grooves, a layer of said fuel electrode being formed on the flat-plate separator, said solid electrolyte being formed in the form of a film layer on the fuel electrode and a layer of said air electrode being formed on the solid electrolyte;
spacers which are arranged along peripheries of said separators among said separators of the cell members stacked up;
fuel supply paths for sending fuel to said fuel electrodes, fuel being sent to the fuel electrodes through grooves of said flat-plate separators and said fuel supply paths;
fuel discharge paths for discharging excessive fuel;
air supply paths for sending air to said air electrodes; and
air exhaust paths for exhausting excessive air.

13. The fuel cell of claim 12, wherein said fuel electrode has a boundary layer, which contacts the separator, which comprises components of the separator and components of the fuel electrode, and which is rich in components of the separator on the side of the separator and rich in components of the fuel electrode on the side of the fuel electrode.

14. The fuel cell of claim 12, wherein said fuel electrode has a boundary layer, which contacts the solid electrolyte, which comprises components of the solid electrolyte and components of the fuel electrode, and which is rich in components of the solid electrolyte on the side of the solid electrolyte and rich in components of the fuel electrode on the side of the fuel electrode.

15. The fuel cell of claim 12, wherein said air electrode has a boundary layer, which contacts the solid electrolyte, which comprises components of the solid electrolyte and components of the air electrode, and which is rich in components of the solid electrolyte on the side of the solid electrolyte and rich in components of the air electrode on the side of the air electrode.

16. The fuel cell of claim 12, wherein said fuel electrode has a boundary layer, which contacts the separator, which comprises components of the separator and components of the fuel electrode, and which is rich in components of the fuel electrode on the side of the fuel electrode;

said fuel electrode has a boundary layer, which contacts the solid electrolyte, which comprises components of the solid electrolyte and components of the fuel electrode, and which is rich in components of the solid electrolyte on the side of the solid electrolyte and rich in components of the fuel electrode on the side of the fuel electrode; and said air electrode has a boundary layer, which contacts the solid electrolyte, which comprises components of the solid electrolyte and components of the air electrode, and which is rich in components of the solid electrolyte on the side of the solid electrolyte and rich in components of the air electrode on the side of the air electrode.

17. The fuel cell of claim 12, which further comprises a substrate selected from the group consisting of Ni sintered plate, Ni mesh, Ni plate and Ni net between the separator and the fuel electrode.

18. The fuel cell of claim 12, which further comprises an oxidation-resistant layer on the surface of the separator on the side of the air electrode.

19. The fuel cell of claim 12, which further comprises a sintered layer selected from the group consisting of lanthanum-manganese oxide doped with strontium oxide and lanthanum cobalt oxide doped with strontium oxide between the air electrode and the separator of the cell members stacked up in layers.

20. The fuel cell of claim 12, which further comprises
a substrate selected from the group consisting of Ni sintered plate, Ni mesh, Ni plate and Ni net between the separator and the fuel electrode;
an oxidation-resistant coating layer on the surface of the separator on the side of the air electrode; and
a sintered layer selected from the group consisting of lanthanum maganese oxide doped with strontium oxide and lanthanum cobalt oxide doped with strontium oxide between the air electrode and the separator of the cell members stacked up in layers.

21. The fuel cell of claim 12, wherein said solid electrolyte is a dense electrolyte made by the use of one selected from the group consisting of Laser Physical Vapor Deposition Method, Plasma Thermal Spraying Method, Electron Beam Vapor Deposition Method and Sputtering Method.

22. The fuel cell of claim 12, wherein said air electrode is an air electrode made from a mixed powder of lanthanum maganese oxide doped with strontium oxide and yttria-stabilized zirconia.

* * * * *